United States Patent [19]

Appleton

[11] Patent Number: 5,004,052
[45] Date of Patent: Apr. 2, 1991

[54] HORSESHOE

[76] Inventor: Arthur I. Appleton, 22 Indian Creek Island, Miami Beach, Fla. 33154

[21] Appl. No.: 263,904

[22] Filed: Oct. 28, 1988

[51] Int. Cl.$^5$ .............................................. A01L 1/00
[52] U.S. Cl. ........................................... 168/4; 168/29
[58] Field of Search ...................................... 168/4, 29

[56] References Cited
FOREIGN PATENT DOCUMENTS

| 38705 | 7/1931 | France | 168/4 |
| 307227 | 4/1933 | Italy | 168/29 |
| 221335 | 9/1924 | United Kingdom | 168/29 |
| 430043 | 6/1935 | United Kingdom | 168/29 |

*Primary Examiner*—Robert P. Swiatek
*Attorney, Agent, or Firm*—Jones, Day, Reavis Pogue

[57] ABSTRACT

The horseshoe includes a traction surface having a toe portion defining a pair of parallel calks and a pair of side portions defining a plurality of inner and outer calks. The calks have a truncated wedge shape designed to increase traction and minimize the build-up of dirt and mud. The horseshoe is also provided with an outer coating of non-stick material which prevents mud and dirt from adhering to the horseshoe to maintain a "clean" traction surface.

7 Claims, 1 Drawing Sheet

HORSESHOE

BACKGROUND OF THE INVENTION

This invention relates, generally, to horseshoes and, more particularly, to a horseshoe having a traction surface coated with a non-stick substance for preventing the adhesion of foreign matter thereto.

Horseshoes providing adequate traction are essential for racehorses where any loss of traction can adversely affect the horse's performance. As a result, horseshoes having a variety of surface configurations designed to improve a racehorse's traction have been developed. The conventional shoe relies on the configuration of the calks to provide sufficient traction. One problem with the known designs is that once the horse has run a short distance over a dirt, grass or mud track, the areas between the calks become imbedded with dirt, grass and mud or combinations thereof. The build-up of mud and dirt between the calks creates a situation where the gripping ability of the horseshoe declines such that traction is lost. Moreover, the extra weight of the horseshoe, due to the build-up of the dirt, grass and mud, can adversely affect the horse's gait thereby impeding performance and increasing the risk of injury.

BRIEF DESCRIPTION OF THE INVENTION

The horseshoe of the present invention overcomes the above-noted shortcomings and provides a traction surface which prevents the build-up of dirt and mud on the horseshoe. Most significantly the horseshoe is coated with a non-stick substance, for example, a thermoplastic resin sold under the registered trademark Xylon ® or polytetraflurorethylene, a polymer compound sold under the registered trademark Teflon ®, such that the dirt and mud will not adhere to the traction surface and will separate from the horseshoe with each stride of the horse. Furthermore, the calks formed on the horseshoe's traction surface are configured to minimize the build up of dirt and mud and to maximize the horse's traction.

OBJECTS OF THE INVENTION

It is a general object of the invention to provide an improved horseshoe.

It is another object of the invention to provide a horseshoe that resists the build-up of mud and dirt thereon.

It is a further object of the invention to provide a horseshoe having better traction than the known prior art devices.

Other objects of the invention, in addition to those set forth above, will become apparent to one of ordinary skill in in the art from the following detailed description of the invention.

DETAILED DESCRIPTION OF THE INVENTION

The horseshoe of the invention is shown, generally, at 1 in FIGS. 1-4 and consists of a toe portion 3 and two identical side portions 5 and 7. The toe portion 3 and the side portions 5 and 7 are formed integrally of a piece of material conforming to the size and shape of a horse's hoof, as will be understood by one of ordinary skill in the art.

Figure 1:
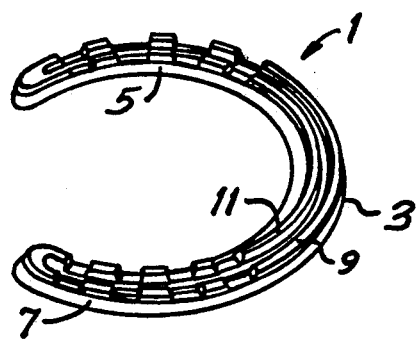
FIG. 1 shows a perspective view of the horseshoe of the invention.
Figure 2:
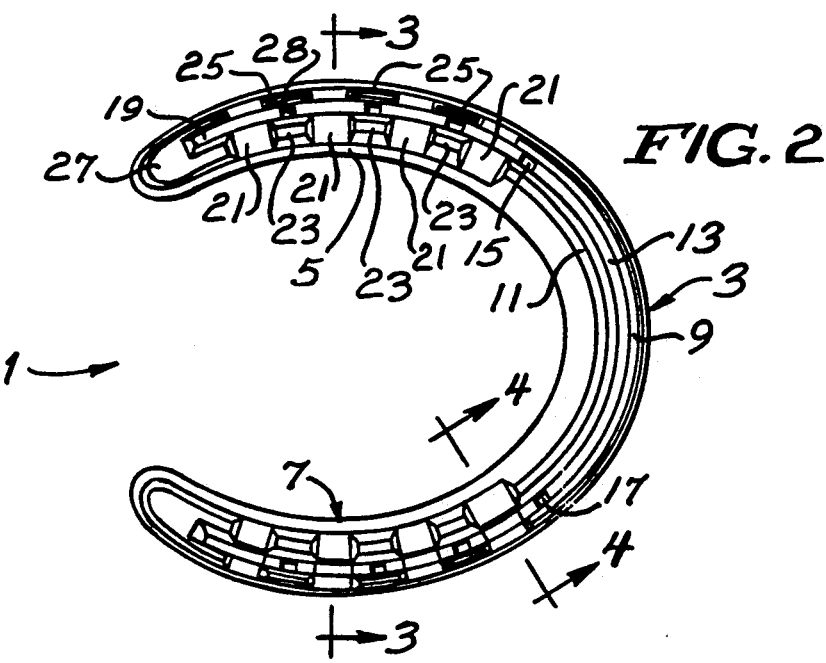
FIG. 2 shows a top plan view of the horseshoe of the invention.
Figure 3:
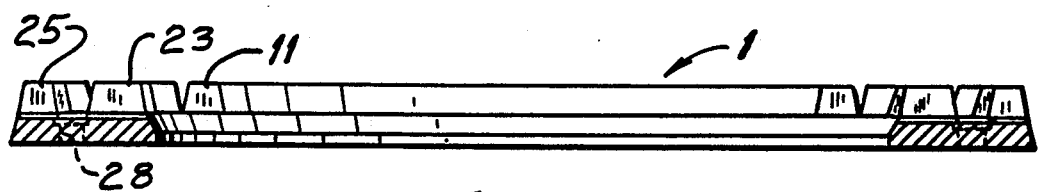
FIG. 3 shows a section view taken along line 3-3 of FIG. 2.
Figure 4:
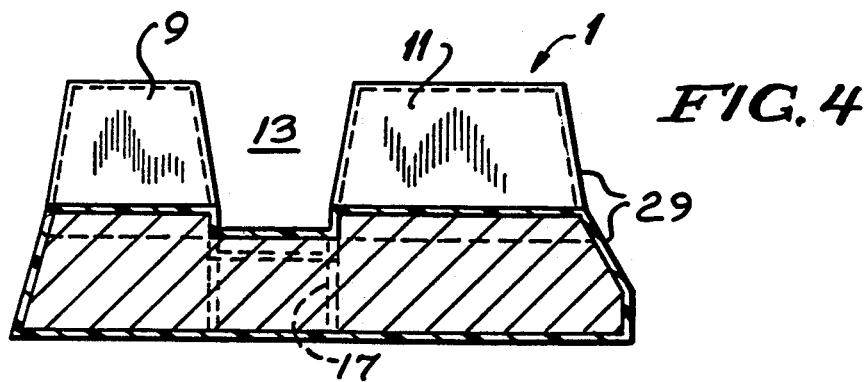
FIG. 4 shows a section view taken along line 4-4 of FIG. 2.

The toe portion 3 has a front calk 9 and a rear calk 11 formed therein. Calks 9 and 11 follow the shape of the toe portion 3 and are substantially parallel to one another. The sides of calks 9 and 11 are angled approximately 10° to the vertical such that the calks narrow as they extend from the horseshoe to form a substantially truncated V-shaped groove 13 therebetween as best shown in FIG. 4. Groove 13 has nail holes 15 and 17 formed therein to facilitate attachment of the horseshoe to a hoof.

Side portions 5 and 7 are identical to one another such that specific reference will be made only with reference to side portion 5. Side portion 5 includes a center groove 19 coextensive with groove 13. Cross-slots 21 are formed substantially perpendicular to center groove 19 to form a plurality of inner calks 23, outer calks 25, and heel calk 27. Nail holes 28 are formed in the center groove 19 between the inner and outer calks. The center groove 19 and cross-slots 21 are formed such that the inner and outer calks have a truncated wedge shape, narrowing as they extend from the shoe.

The shape of the calks in both the toe portion 3 and side portions 5 and 7 minimizes the build-up of dirt and mud on the shoe by providing spaces between the calks which diverge as they extend from the shoe. The divergent spaces allow the dirt and mud to be easily separated from the shoe.

As best illustrated in FIG. 4, a coating of non-stick material 29 is formed on the surface of the horseshoe. The material is preferably Teflon ® although other suitable non-stick materials may also be used.

The non-stick coating prevents the dirt and mud from adhering to the horseshoe and allows the dirt and mud to be thrown from the shoe with each stride of the horse. Moreover, the shaping of the calks minimizes the buildup of the dirt and mud and improves traction. As a result, the horse is able to run with a "clean" shoe and the traction provided by the horseshoe's surface remains consistent over the course of the run.

The present disclosure has been made by way of example only and numerous modifications and changes in the structure, arrangement and materials of the various components will be apparent to one of ordinary skill in the art without departing from the spirit and scope of the invention.

I claim:

1. An improved horseshoe comprising:
   a. a traction surface having a plurality of calks, the traction surface including a toe portion and integrally formed side portions extending from opposite sides of the toe portion; and
   b. a coating of Teflon formed over the traction surface, whereby dirt and mud will not build up on the traction surface.

2. The horseshoe according to claim 1, wherein said toe portion includes a front and rear calk and a groove extending the length of the toe portion between said front calk and said rear calk.

3. The horseshoe according to claim 1, wherein each of said side portions includes a center groove and a plurality of cross-slots disposed substantially perpendicular to said center groove and defining a plurality of inner calks, outer calks and a heel calk.

4. The horseshoe according to claim 3, wherein said front calk and rear calk have a truncated wedge shape.

5. The horseshoe according to claim 4, wherein said inner calks and outer calks have a truncated wedge shape.

6. The horseshoe according to claim 4, wherein said center groove includes portions defining a plurality of nail holes disposed between pairs of the inner and outer calks.

7. The horseshoe according to claim 3, wherein said groove includes portions defining a plurality of nail holes.

* * * * *